(12) United States Patent
Ohta et al.

(10) Patent No.: US 7,564,653 B2
(45) Date of Patent: Jul. 21, 2009

(54) MAGNETIC DISK DRIVE APPARATUS WITH MAGNETIC HEAD SLIDERS IN A MAGNETIC LOOP WHILE IN AN UNLOADED STATE

(75) Inventors: Naoki Ohta, Tokyo (JP); Kazuki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 391 days.

(21) Appl. No.: 11/617,201

(22) Filed: Dec. 28, 2006

(65) Prior Publication Data

US 2008/0158723 A1     Jul. 3, 2008

(51) Int. Cl.
    *G11B 5/54* (2006.01)
(52) U.S. Cl. ................................ 360/254.8; 360/254.7
(58) Field of Classification Search ............. 360/254.7, 360/254.8, 254.9, 255, 255.6, 255.7
See application file for complete search history.

(56) References Cited

U.S. PATENT DOCUMENTS

| | | | | |
|---|---|---|---|---|
| 7,365,930 | B2 * | 4/2008 | Ishii et al. ...................... | 360/75 |
| 7,474,509 | B2 * | 1/2009 | Antoku ..................... | 360/254.8 |
| 2002/0044386 | A1 * | 4/2002 | Koyanagi et al. ........ | 360/254.8 |
| 2004/0184194 | A1 * | 9/2004 | Hawwa et al. ........... | 360/254.7 |
| 2006/0007600 | A1 * | 1/2006 | Suzuki ....................... | 360/255 |
| 2006/0023366 | A1 | 2/2006 | Antoku | |

FOREIGN PATENT DOCUMENTS

| | | |
|---|---|---|
| JP | 11-345471 | 12/1999 |
| JP | 2002-150510 | 5/2002 |

* cited by examiner

*Primary Examiner*—Jefferson Evans
(74) *Attorney, Agent, or Firm*—Oblon, Spivak, McClelland, Maier & Neustadt, P.C.

(57) ABSTRACT

A magnetic disk drive apparatus includes a magnetic disk, a ramp mechanism, a pair of magnetic head sliders each having an MR read head element, and a load/unload mechanism for retracting the pair of magnetic head sliders to the ramp mechanism under unloading states and for putting the pair of magnetic head sliders back to face front and back surfaces of the magnetic disk respectively under loading states. The ramp mechanism has head resting portions and a pair of permanent magnets. The pair of magnetic head sliders respectively resting in the head resting portions in a manner to face to each other during unloaded states. The pair of permanent magnets generates a closed loop magnetic field applied to the pair of magnetic head sliders rested in the respective head resting portions. The magnetic fields applied to the respective magnetic head sliders are in opposite directions along the track width of the magnetic head sliders.

7 Claims, 9 Drawing Sheets

MAGNETIC DISK DRIVE APPARATUS WITH MAGNETIC HEAD SLIDERS IN A MAGNETIC LOOP WHILE IN AN UNLOADED STATE

BACKGROUND OF THE INVENTION

1. Field of the Invention

The present invention relates to a magnetic disk drive apparatus with a plurality of magnetic head sliders.

2. Description of the Related Art

A magnetic disk drive apparatus has in general a single disk or a plurality of magnetic disks and a plurality of magnetic head sliders each having a thin-film magnetic head with a magnetoresistive effect (MR) read head element and an inductive write head element. Two magnetic head sliders face in operation a front surface and a back surface of each magnetic disk, respectively.

There is a magnetic disk drive apparatus with a load/unload mechanism for retracting the magnetic head from the magnetic disk upon non-operation and for putting the magnetic head back on the magnetic disk upon operation, in order to enhance the resistance to shock externally applied.

Some magnetic disk drive apparatuses with such load/unload mechanisms apply magnetic field to the unloaded magnetic head so as to suppress Barkhausen noise of the MR read head element from occurring and to reduce read errors. Japanese patent publication No. 2002-150510A and U.S. patent publication No. 2006/0023366A1 disclose magnetic disk drive apparatuses having magnetic field application mechanisms at their ramp portions for applying magnetic field to the unloaded magnetic heads in order to re-magnetize their read head elements.

However, according to such magnetic disk drive apparatus disclosed in Japanese patent publication No. 2002-150510A and U.S. patent publication No. 2006/0023366A1, the magnetic field in a single direction is applied from the magnetic field application mechanism to both the magnetic head sliders mounted to face the front surface and back surface of the magnetic disk in operations. Therefore, for each magnetic head slider located at the front surface side or the back surface side, the magnetic field in the opposite direction to each other is applied. Thus, it is necessary to mount, at the front surface side and the back surface side, two kinds of magnetic head sliders with opposite magnetization directions for magnetically stabilizing their magnetization-free layers. In other words, according to the conventional magnetic disk drive apparatus, necessary is to prepare two types of magnetic head with different magnetic bias directions causing the versatility of magnetic head to extremely deteriorate.

SUMMARY OF THE INVENTION

It is therefore an object of the present invention to provide a magnetic disk drive apparatus, whereby magnetic domain conditions of a magnetic head can be recovered and magnetic characteristics of the head can be renewed by re-magnetizing the magnetic head during unloaded states, even if used are magnetic head sliders having single-kind thin-film magnetic heads in which the magnetic bias direction for the magnetization-free layer is defined to a single direction.

According to the present invention, a magnetic disk drive apparatus includes a magnetic disk, a ramp mechanism, a pair of magnetic head sliders each having an MR read head element, and a load/unload mechanism for retracting the pair of magnetic head sliders to the ramp mechanism under unloading states and for putting the pair of magnetic head sliders back to face front and back surfaces of the magnetic disk respectively under loading states. The ramp mechanism has head resting portions and a pair of permanent magnets. The pair of magnetic head sliders respectively resting in the head resting portions in a manner to face to each other during unloaded states. The pair of permanent magnets generates a closed loop magnetic field applied to the pair of magnetic head sliders rested in the respective head resting portions. The magnetic fields applied to the respective magnetic head sliders are in opposite directions along the track width of the magnetic head sliders.

The closed loop magnetic field is produced from the pair of permanent magnets mounted in the ramp mechanism and applied to the pair of magnetic head sliders rested in the respective head resting portions in a manner to face to each other or to face a front surface and a back surface of the magnetic disk. According to the present invention, particularly, the magnetic fields applied to the respective magnetic head sliders are in opposite directions along the track width of these magnetic head sliders. That is, for each magnetic head slider, the magnetic field is applied in the same direction along the track width. Thus, as for the pair of magnetic head sliders, it is possible to use the same kind of magnetic head sliders each provided with a thin-film magnetic head defined to have the same magnetization direction for its magnetization-free layer in order to set up the magnetic domain state of the magnetization-free layer and to revive the characteristics.

It is preferred that the closed loop magnetic field is a magnetic field passing through a first magnetic pole end face of one of the permanent magnets, one of the magnetic head sliders rested in the head resting portion, a first magnetic pole end face of the other one of the permanent magnets, a second magnetic pole end face, opposite to the first magnetic pole end face, of the other one of the permanent magnets, the other one of the magnetic head sliders rested in the head resting portion, and a second magnetic pole end face, opposite to the first magnetic pole end face, of the one of the permanent magnets.

It is also preferred that the permanent magnets have magnetic pole end surfaces substantially in parallel to air bearing surfaces (ABSs) of the pair of magnetic head sliders rested in the head resting portions.

It is further preferred that the permanent magnets have magnetic pole end surfaces inclined to air bearing surfaces of the pair of magnetic head sliders rested in the head resting portions. By thus inclining the magnetic pole end faces of the permanent magnets, it is possible to apply, to the resting magnetic head sliders, a magnetic field having a magnetic flux density of about 1.5 times higher than that of the permanent magnets keeping their magnetic pole end faces substantially parallel to the track width direction.

It is preferred that the pair of permanent magnets is mounted inside the ramp mechanism.

It is also preferred that the ramp mechanism further has soft magnetic members formed at positions separated from the pair of permanent magnets in the sides opposite to the head resting portions and running in parallel to the pair of permanent magnets. By additionally mounting the soft magnetic members, it is possible to reduce magnetic field leaked toward the magnetic disk.

It is further preferred that the ramp mechanism further has guides for guiding the pair of magnetic head sliders to the head resting portions respectively under the unloading states.

Further objects and advantages of the present invention will be apparent from the following description of the preferred embodiments of the invention as illustrated in the accompanying drawings.

DESCRIPTION OF THE PREFERRED EMBODIMENTS

Figure 1:
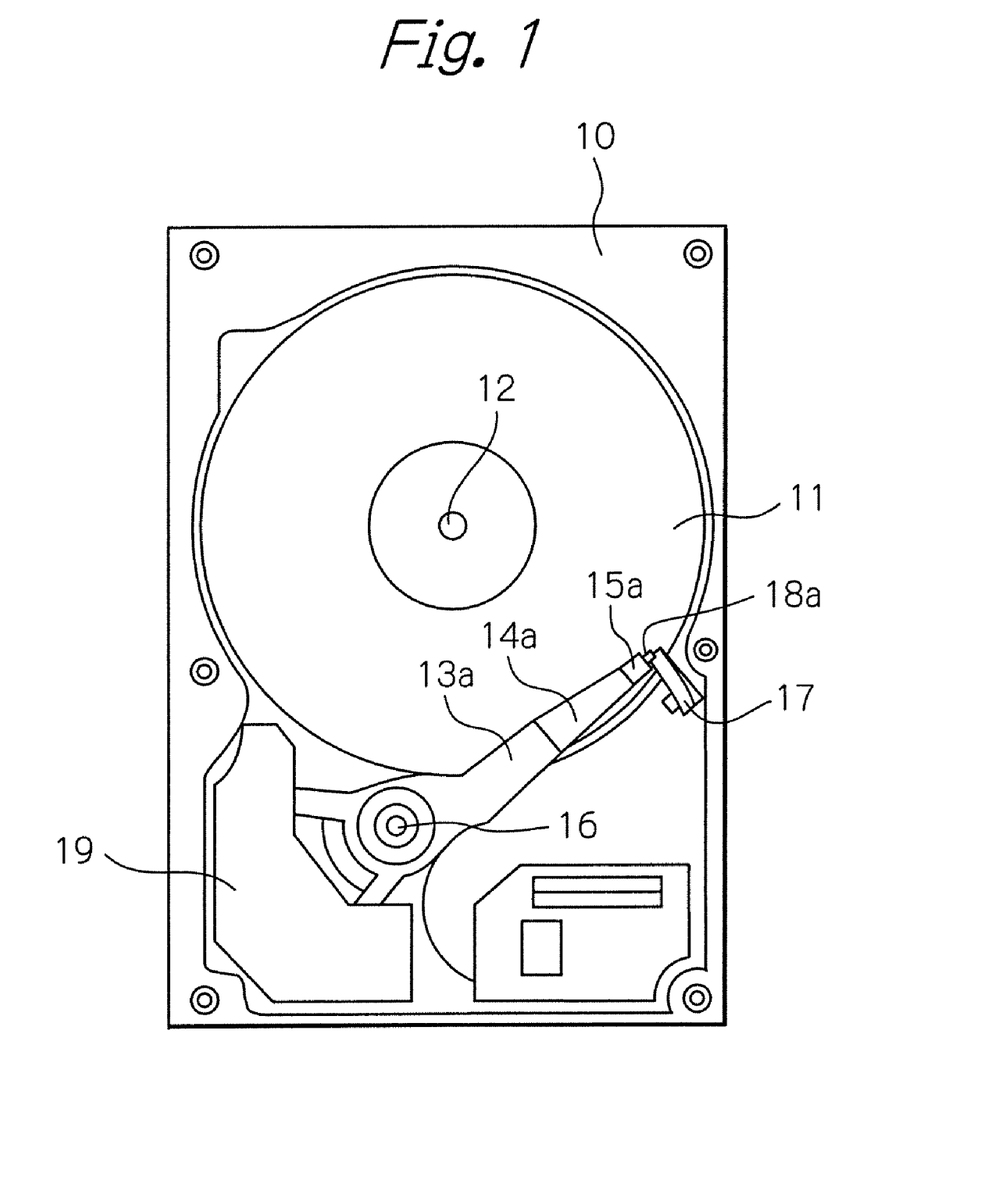
FIG. 1 shows a plane view schematically illustrating whole configuration of a load/unload type magnetic disk drive apparatus as a preferred embodiment according to the present invention.

FIG. 1 schematically illustrates the whole configuration of a load/unload type hard disk drive (HDD) apparatus as a preferred embodiment according to the present invention.

In the FIG., reference numeral 10 denotes a housing of the HDD, 11 denotes a magnetic disk or hard disk rotationally driven about a rotational axis 12 by a spindle motor (not shown), 13a denotes a head arm assembly (HAA), 17 denotes a ramp mechanism, and 19 denotes a magnet portion of a voice coil motor (VCM). The HAA 13a has a suspension 14a, a magnetic head slider 15a with a thin-film magnetic head, mounted on the suspension 14a at a top end section of the HAA, and a coil portion of the VCM at a rear end section of the HAA. This HAA 13a can swing around a horizontal rotation axis 16 over or in parallel with a front surface of the magnetic disk 11. The ramp mechanism 17 is mounted over a region from the outside of a data area on the magnetic disk 11 to the outside of the magnetic disk 11 and has an inclined surface on which the top end of the HAA 13a, in other words, a tab 18a formed at the top end of the suspension 14a rests to make the magnetic head slider 15a under the unloaded states. Although it is not clearly indicated in this FIG., the magnetic disk drive apparatus also has an HHA 13b (FIG. 4) that is simultaneously driven with the HAA 13a by the VCM and capable of swinging around the horizontal rotation axis 16 over or in parallel with a back surface of the magnetic disk 11. This HAA 13b also has a suspension 14b (FIG. 4) and a magnetic head slider 15b (FIG. 4) with a thin-film magnetic head, mounted on the suspension 14b at a top end section of this HAA 13b. At the top end of the suspension 14b, formed is a tab 18b (FIG. 4).

Each of the magnetic head sliders 15a and 15b has on its rear end surface or trailing edge surface the thin-film magnetic head consisting of an inductive write head element and an MR read head element such as a giant magnetoresistive effect (GMR) read head element or a tunnel magnetoresistive effect (TMR) read head element.

During operation, namely during high-speed rotation of the magnetic disk, the magnetic head sliders 15a and 15b fly with a low flying height above the front and back surfaces of the magnetic disk 11, respectively, and thus they are under loaded states. Contrary to this, during non-operation, namely during stop of the magnetic disk or during low-speed rotation for the start or stop of the magnetic disk, the top ends of the HAA 13a and 13b rest on the ramp mechanism 17, and thus the magnetic head sliders 15a and 15b are under unloaded states. Such load/unload operations are executed by a load/unload mechanism that is not clearly shown in the FIG. but is well-known in this technical field.

Figures 2A, 2B:
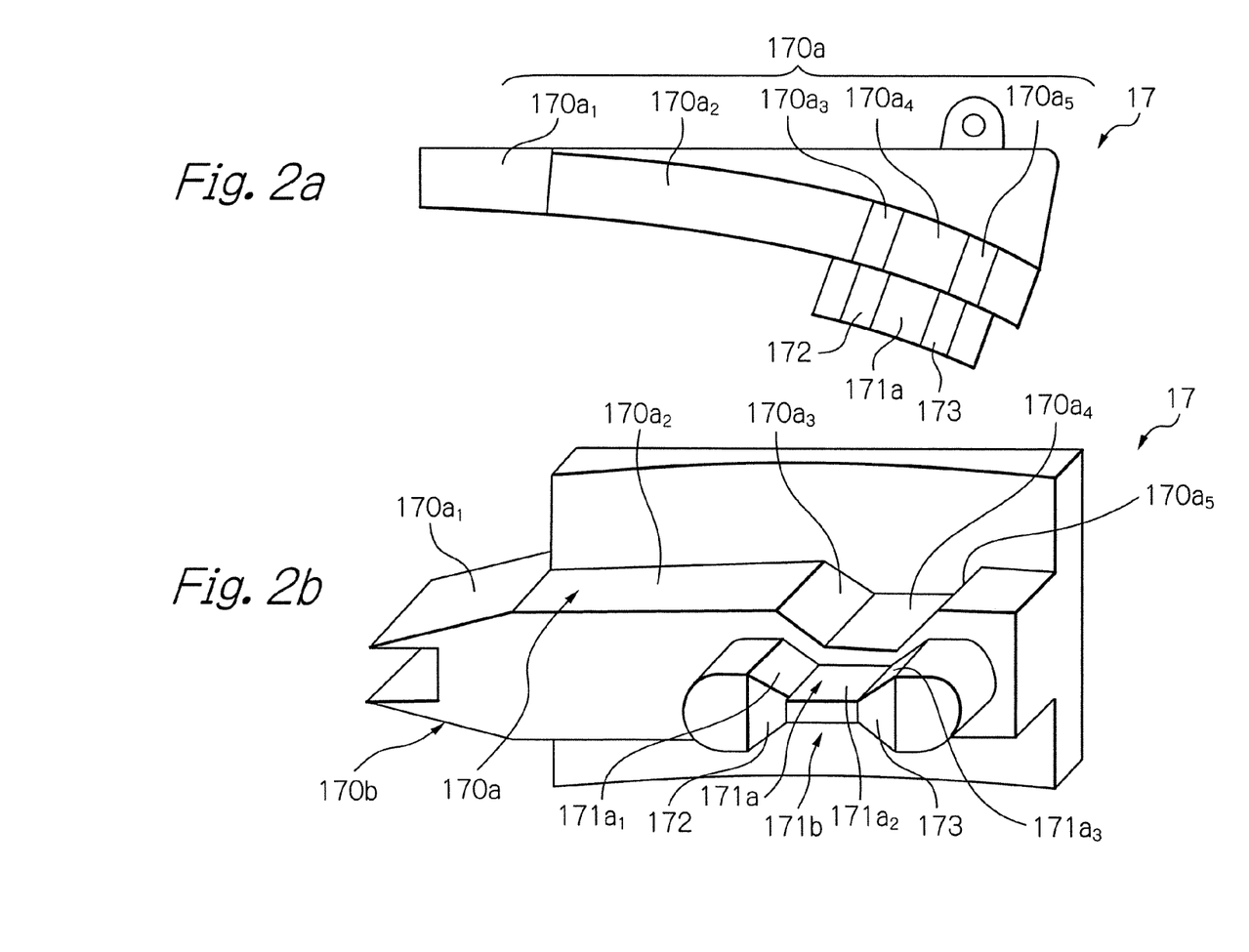
FIGS. 2a and 2b show a plane view and a perspective view illustrating a configuration example of a ramp mechanism in the magnetic disk drive apparatus of the embodiment shown in FIG. 1.
Figure 3:
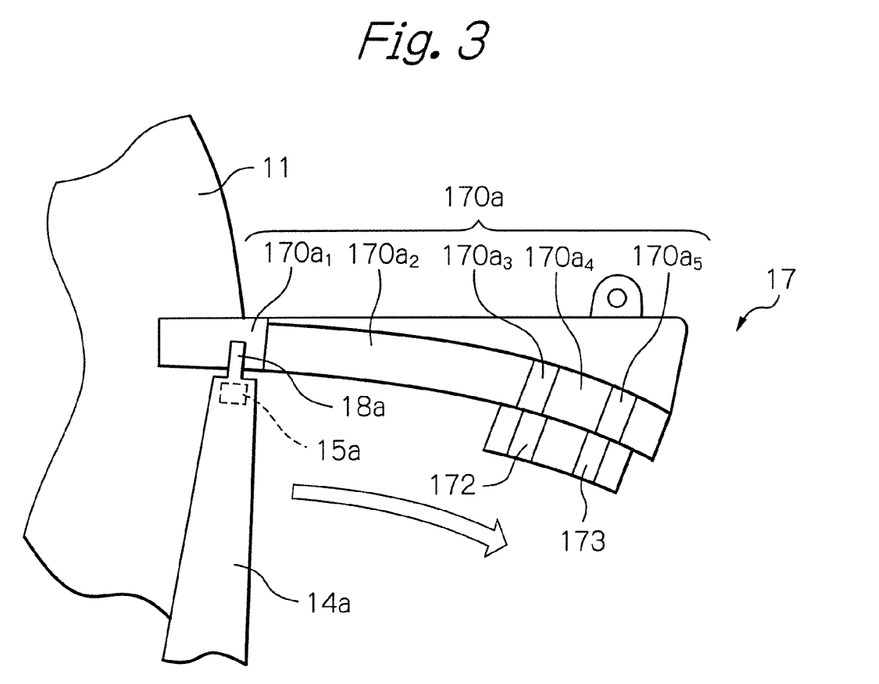
FIG. 3 shows a plane view illustrating a state where a magnetic head slider is retracted into its unloaded position in the magnetic disk drive apparatus of the embodiment shown in FIG. 1.
Figure 4:
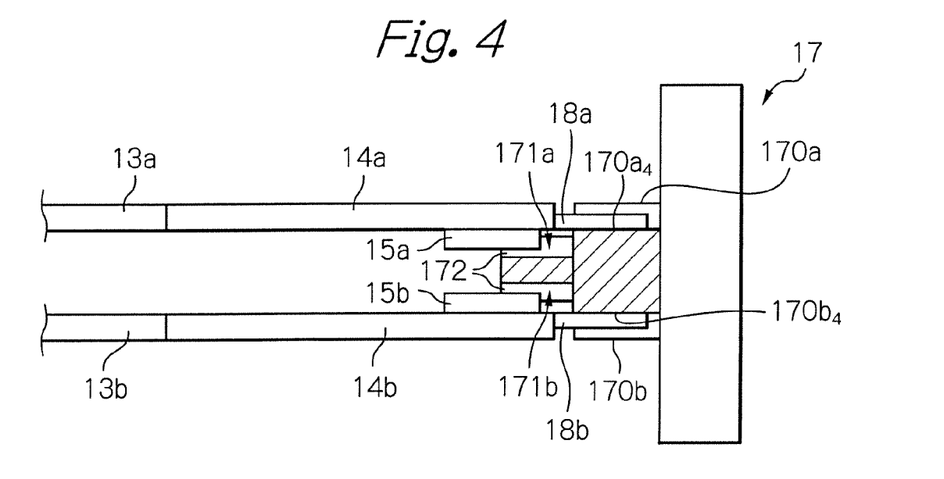
FIG. 4 shows a side view illustrating the state shown in FIG. 3 seen from the lateral side.

FIGS. 2a and 2b illustrate a configuration example of the ramp mechanism 17 in the magnetic disk drive apparatus of the embodiment shown in FIG. 1, and FIGS. 3 and 4 illustrate a state where the magnetic head slider is retracted into its unloaded position in the magnetic disk drive apparatus of the embodiment shown in FIG. 1. It should be noted that FIG. 2a indicates the top view seen from the top toward the front surface of the magnetic disk and FIG. 4 indicates the side view of the state shown in FIG. 3, seen from the lateral side.

As shown in these FIGS., the ramp mechanism 17 has tab guides 170a and 170b, head resting portions 171a and 171b, and a pair of permanent magnets 172 and 173. The tab guide 170a functions such that the tab 18a of the HAA 13a located at the front surface side of the magnetic disk 11 runs on and slides on and along its top surface to guide the magnetic head slider 15a. The guided magnetic head slider 15a rests at the head resting portion 171a during the unloaded states. The tab guide 170b functions such that the tab 18b of the HAA 13b located at the back surface side of the magnetic disk 11 slides on and along its bottom surface to guide the magnetic head slider 15b. The guided magnetic head slider 15b rests at the head resting portion 171b during the unloaded states. The permanent magnets 172 and 173 are mounted in parallel with each other at both sides of the head resting portions 171a and 171b to sandwich them.

Most of the ramp mechanism 17 is made of a nonmagnetic material such as a resin material for example nylon, and the permanent magnets 172 and 173 are formed by a small sized but strong permanent magnet made of for example a neodymium magnet or a samarium-cobalt magnet.

The tab guide 170a consists of a first inclined section $170a_1$ rising with a slope from a position near the surface of the magnetic disk, a first flat section $170a_2$ continuously connected to the first inclined section $170a_1$, a second inclined section $170a_3$ continuously connected to the first flat section $170a_2$ and falling there from with a slope, a second flat section $170a_4$ continuously connected to the second inclined section $170a_3$, and a third inclined section $170a_5$ continuously connected to the second flat section $170a_4$ and rising there from with a slope. The tab guide 170b also consists of a similar first inclined section, a similar first flat section, a similar second inclined section, a similar second flat section $170b_4$, and a similar third inclined section. The head resting portion 171a is located at near side from the second inclined section $170a_3$, the second flat section $170a_4$ and the third inclined section $170a_5$ of the tab guide 170a, in other words at the suspension 14a side. Similarly, the head resting portion 171b is located at near side from the second inclined section, the second flat section and the third inclined section of the tab guide 170b, in other words at the suspension 14b side.

The head resting portions 171a and 171b are formed in a recessed shape as shown in FIG. 2b so that the magnetic head sliders 15a and 15b respectively rest thereon when the tabs 18a and 18b of the HAA 13a and 13b are guided on the second flat sections $170a_4$ and $170b_4$ of the tab guides. More concretely, the head resting portion 171a has a first inclined section $171a_1$ falling with a slope, a flat section $171a_2$ continuously connected to the first inclined section $171a_1$, and a second inclined section $171a_3$ continuously connected to the flat section $171a_2$ and rising there from with a slope. During the unloaded state, the magnetic head slider 15a is retained above and parallel to the flat section $171a_2$ and thus sent into a resting mode. Also, the head resting portion 171b has a similar inclined section, a similar flat section and a similar second inclined section. During the unloaded state the magnetic head slider 15b is retained above and parallel to this flat section and thus sent into a resting mode.

The pair of permanent magnets 172 and 173 is mounted in parallel with each other at both sides in the track-width direction of the resting magnetic head sliders 15a and 15b to sandwich the head resting portions 171a and 171b. In other words, each of the permanent magnets 172 and 173 is mounted such that an axis between its magnetic poles becomes perpendicular to the flat sections of the head resting portions 171a and 171b, that is, perpendicular to the ABSs of the resting magnetic head sliders 15a and 15b.

Figure 5:
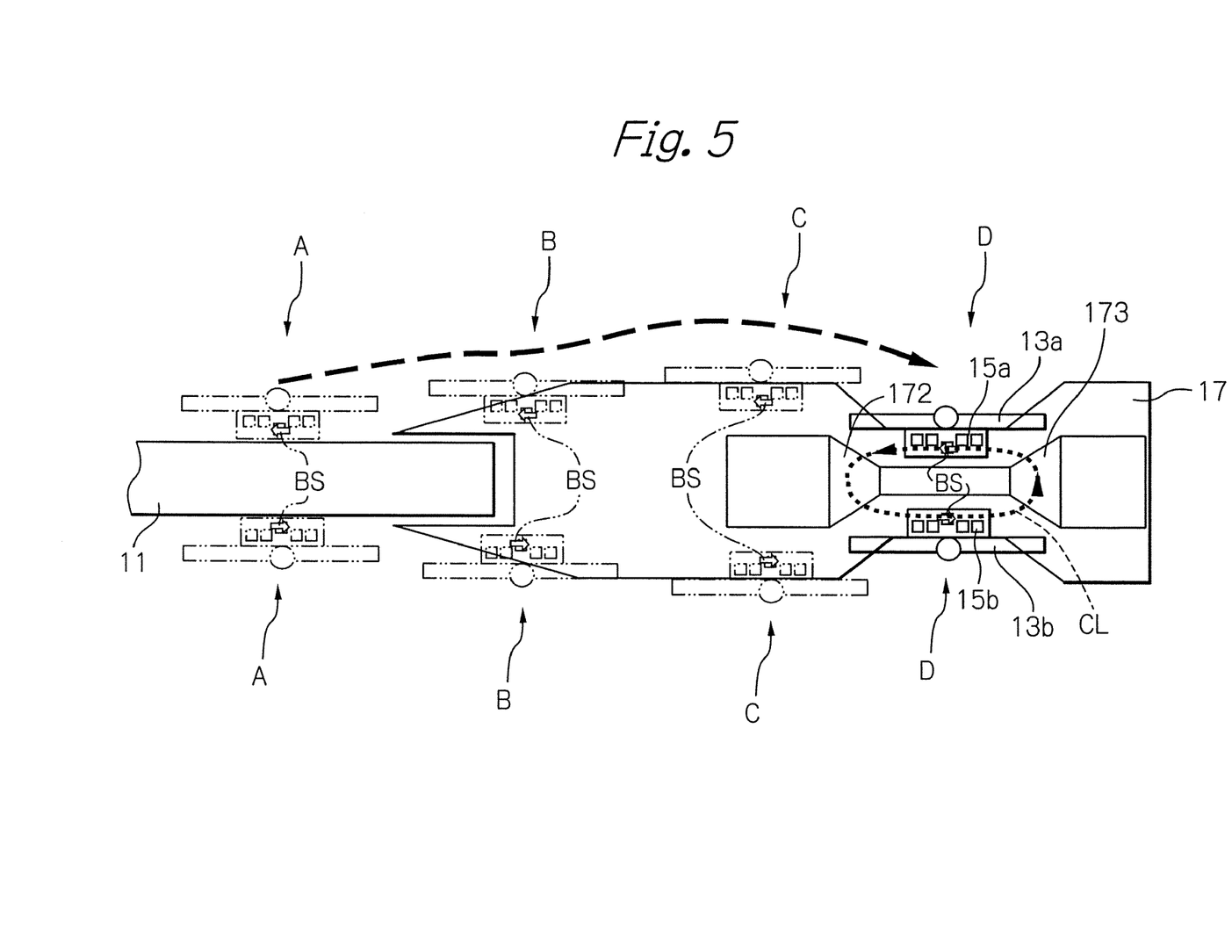
FIG. 5 shows a side view illustrating unloading operation of the magnetic disk drive apparatus of the embodiment shown in FIG. 1.

FIG. 5 illustrates unloading operation of the magnetic disk drive apparatus of the embodiment shown in FIG. 1.

Under the loaded states (states shown by A in the FIG.), the magnetic head sliders 15a and 15b face the magnetic disk 11. When the HAAs 13a and 13b turn toward outside of the magnetic disk 11 to unload the magnetic head sliders 15a and 15b, first the tabs 18a and 18b of the HAAs 13a and 13b run on the tab guides 170a and 170b of the ramp mechanism 17, and then these tabs 18a and 18b slide on and along the tab guides 170a and 170b with being pressed against the tab guide surfaces due to pressing forces from the suspensions 14a and 14b, respectively (states shown by B and C in the FIG.).

Then, when the tabs 18a and 18b reach the second flat sections of the tab guides 170a and 170b, the HAAs 13a and 13b complete to turn and thus the magnetic head sliders 15a and 15b stay in the head resting portions 171a and 171b to come into unloaded or resting states, respectively (states shown by D in the FIG.).

As mentioned above, the pair of the permanent magnets 172 and 173 is mounted such that axes between their respective magnetic poles become perpendicular to the ABSs of the magnetic head sliders 15a and 15b rested in the head resting portions 171a and 171b, respectively. Thus, a closed loop magnetic field CL shown in FIG. 5 is produced from these permanent magnets 172 and 173, and applied to the resting magnetic head sliders 15a and 15b. Namely, the magnetic field passes through the closed loop as a lower magnetic pole end face of the permanent magnet 172→the magnetic head slider 15b rested in the head resting portion 171b →a lower magnetic pole end face of the permanent magnet 173→an upper magnetic pole end face of the permanent magnet 173→the magnetic head slider 15a rested in the head resting portion 171a →an upper magnetic pole end face of the permanent magnet 172→the lower magnetic pole end face of the permanent magnet 172. Therefore, a magnetic field in the track width direction is applied to the magnetic head sliders 15a and 15b to set up the magnetic domain state of the magnetic heads and to revive their characteristics. In particular, according to the present invention, the magnetic fields in opposite direction along the track width are applied to the magnetic head sliders 15a and 15b mounted inside out with each other, respectively. Thus, as for the magnetic head sliders 15a and 15b, it is possible to use the same kind of magnetic head sliders each provided with a thin-film magnetic head defined to have the same magnetization direction for its magnetization-free layer as shown by arrows BS in FIG. 5 in order to set up the magnetic domain state of the magnetization-free layer and to revive the characteristics. Also, according to the present invention, because such local magnetic field of the closed loop configuration is used, no magnetic field is applied to the magnetic disk and thus no harmful effect is provided thereto.

Figure 6:
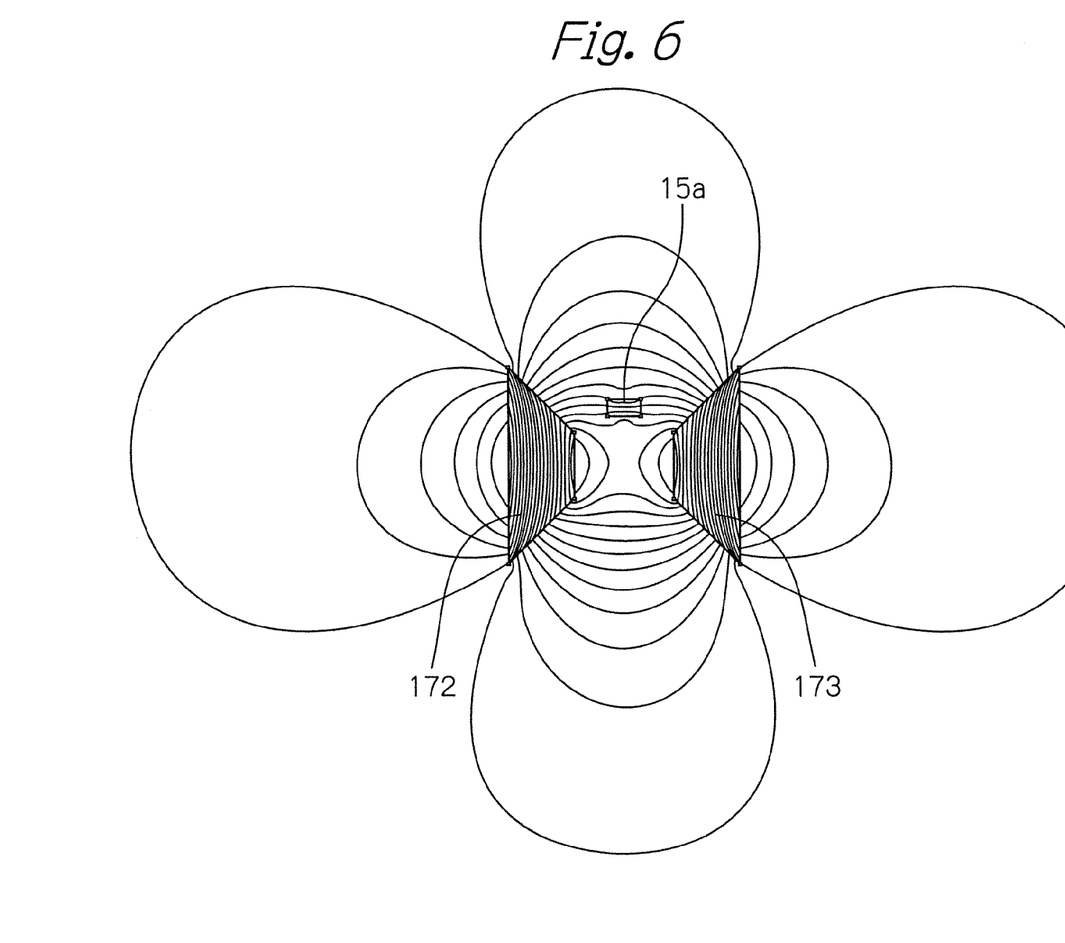
FIG. 6 shows a view illustrating a looped magnetic field and its magnetic flux density, produced from the ramp mechanism in the embodiment shown in FIG. 1.

In this embodiment, particularly, the upper and lower magnetic pole end faces of the permanent magnets 172 and 173 are configured to incline to the resting magnetic head sliders 15a and 15b, respectively, as shown in FIG. 2b. More concretely, in this embodiment, one magnetic pole end face of the permanent magnet 172 configures the first inclined section $171a_1$ of the head resting portion 171a, and one magnetic pole end face of the permanent magnet 173 configures the second inclined section $171a_3$ of the head resting portion 171a. Similarly, the other magnetic pole end face of the permanent magnet 172 configures the first inclined section of the head resting portion 171b, and the other magnetic pole end face of the permanent magnet 173 configures the second inclined section of the head resting portion 171b. As will be understood from FIG. 6, by thus inclining the magnetic pole end faces of the permanent magnets 172 and 173, it is possible to apply, to the resting magnetic head sliders, a magnetic field having a magnetic flux density of about 1.5 times higher than that of the permanent magnets keeping the magnetic pole end faces substantially parallel to the ABSs.

Figure 7:
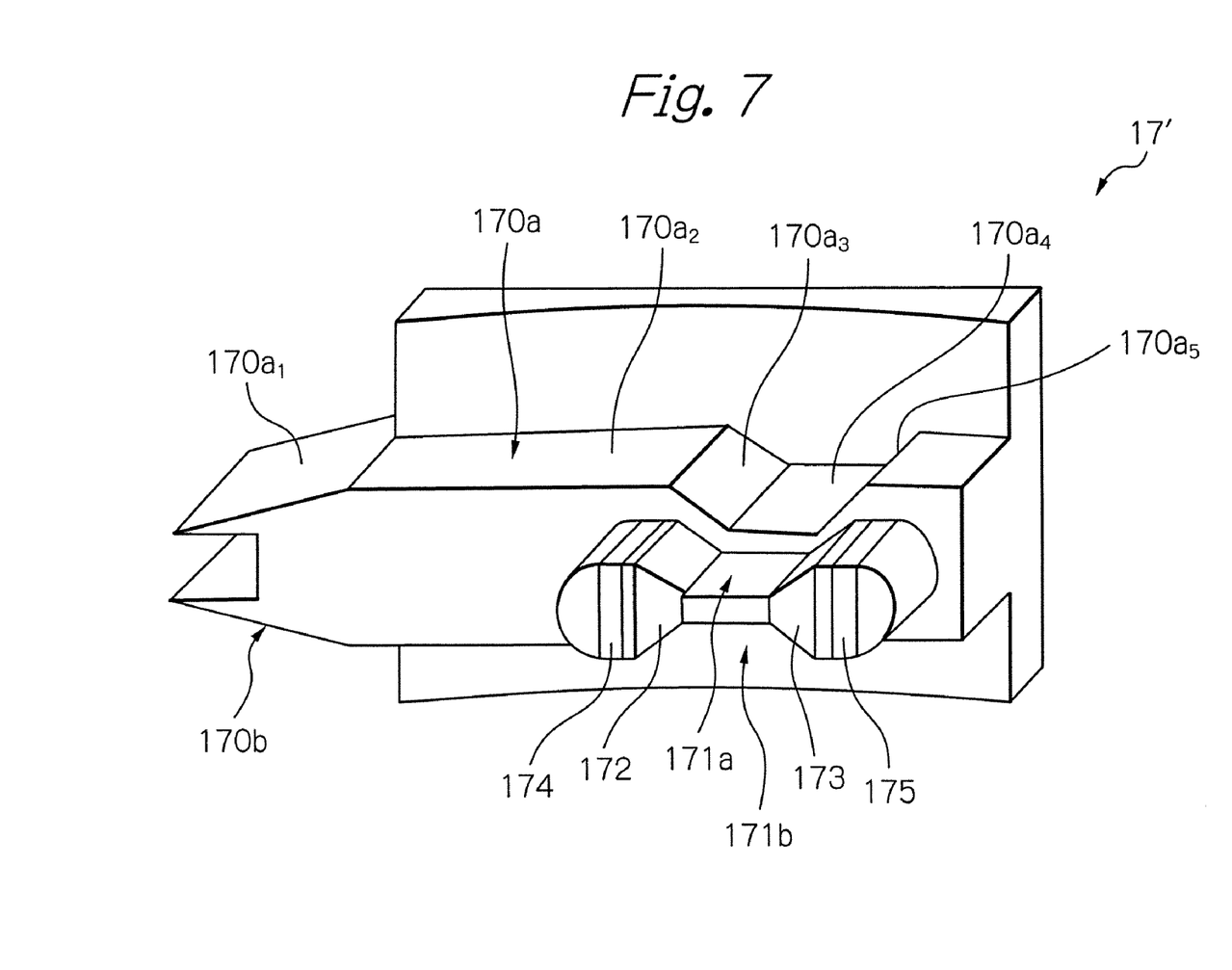
FIG. 7 shows a perspective view illustrating a configuration example of a ramp mechanism in another embodiment according to the present invention.

FIG. 7 illustrates a configuration example of a ramp mechanism in another embodiment according to the present invention. The configuration, operations and advantages in this embodiment are substantially similar to those in the embodiment shown in FIGS. 1 to 6 except that this embodiment has soft magnetic members for leading a part of the magnetic field from the permanent magnets. Therefore, herein after, only the difference will be described and the same reference numerals are used for the same components as that in the embodiment of FIGS. 1 to 6.

As shown in FIG. 7, the ramp mechanism 17' in this embodiment has soft magnetic members 174 and 175 in addition to that in the embodiment of FIGS. 1 to 6. These soft magnetic members 174 and 175 are formed at positions separated from the permanent magnets 172 and 173 in the sides opposite to the head resting portions 171a and 171b and run in parallel to these permanent magnets 172 and 173.

Figure 8:
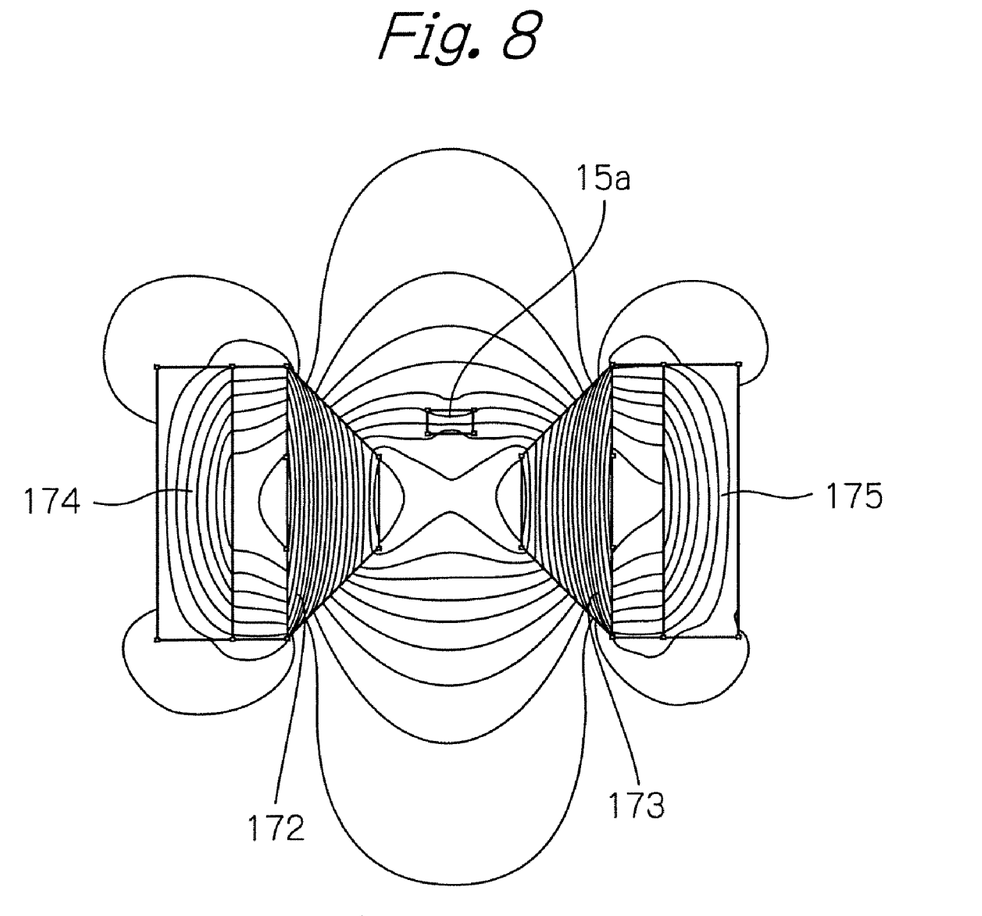
FIG. 8 shows a view illustrating a loop magnetic field and its magnetic flux density, produced from the ramp mechanism in the embodiment shown in FIG. 7.

A part of the magnetic field from the permanent magnets 172 and 173 is led through these soft magnetic members 174 and 175 and thus magnetic field leaked toward the magnetic disk can be reduced. Namely, according to this embodiment, by additionally mounting the soft magnetic members 174 and 175 at positions separated from the permanent magnets 172 and 173 in the sides opposite to the head resting portions 171a and 171b, it is possible to apply the magnetic field having a lower magnetic flux density than that in the embodiment of FIGS. 1 to 6 but having a reduced leaked magnetic field, to the resting magnetic head sliders as shown in FIG. 8.

Figure 9:
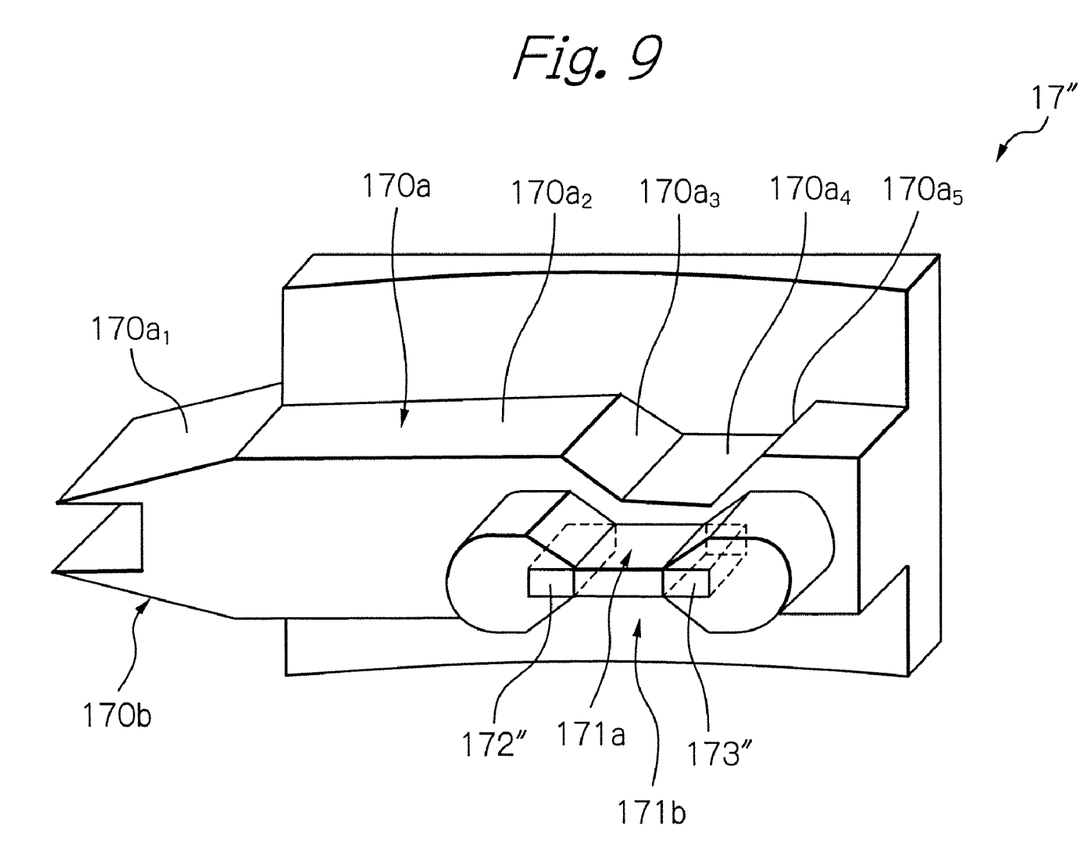
FIG. 9 shows a perspective view illustrating a configuration example of a ramp mechanism in further embodiment according to the present invention.

FIG. 9 illustrates a configuration example of a ramp mechanism in further embodiment according to the present invention. The configuration, operations and advantages in this embodiment are substantially similar to those in the embodiment shown in FIGS. 1 to 6 except for a shape of the permanent magnets. Therefore, herein after, only the difference will be described and the same reference numerals are used for the same components as that in the embodiment of FIGS. 1 to 6.

As shown in FIG. 9, the ramp mechanism 17" in this embodiment has a pair of permanent magnets 172" and 173" each having a rectangular parallelepiped shape. Magnetic pole end surfaces of these permanent magnets 172" and 173" are in parallel to the ABSs of the resting magnetic head sliders 15a and 15b.

Figure 10:
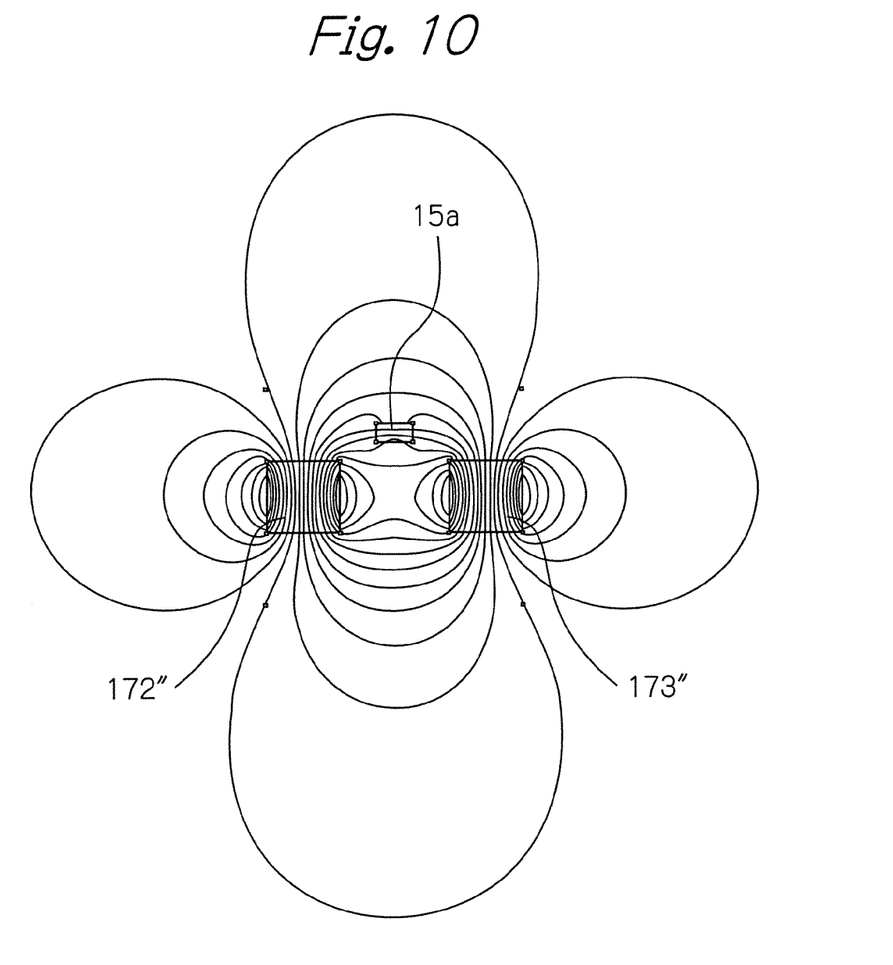
FIG. 10 shows a view illustrating a loop magnetic field and its magnetic flux density, produced from the ramp mechanism in the embodiment shown in FIG. 9.

Using of such permanent magnets 172" and 173" results that a magnetic field having a lower magnetic flux density than that in the embodiment of FIGS. 1 to 6 is applied to the resting magnetic head sliders as shown in FIG. 10.

Although the aforementioned embodiments concern the magnetic disk drive apparatus having the single magnetic disk and the pair of magnetic head sliders facing the front and back surfaces of this magnetic disk during the loaded states, the present invention is similarly applicable to a magnetic disk drive apparatus having a plurality of magnetic disks and a plurality of pairs of magnetic head sliders facing the front and back surfaces of the respective magnetic disks during the loaded states.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus comprising:
   a magnetic disk;
   a ramp mechanism;
   a pair of magnetic head sliders each having a magnetoresistive effect read head element; and
   a load/unload means for retracting said pair of magnetic head sliders to said ramp mechanism under unloading states and for putting said pair of magnetic head sliders back to face front and back surfaces of said magnetic disk respectively under loading states,
   said ramp mechanism having head resting portions and a pair of permanent magnets, said pair of magnetic head sliders respectively resting in said head resting portions in a manner to face to each other during unloaded states, said pair of permanent magnets generating a closed loop magnetic field applied to said pair of magnetic head sliders rested in the respective head resting portions, the magnetic fields applied to the respective magnetic head sliders being in opposite directions along the track width of the magnetic head sliders.

2. The magnetic disk drive apparatus as claimed in claim 1, wherein said closed loop magnetic field is a magnetic field passing through a first magnetic pole end face of one of the permanent magnets, one of the magnetic head sliders rested in the head resting portion, a first magnetic pole end face of the other one of the permanent magnets, a second magnetic pole end face, opposite to said first magnetic pole end face, of said other one of the permanent magnets, the other one of the magnetic head sliders rested in the head resting portion, and a second magnetic pole end face, opposite to said first magnetic pole end face, of said one of the permanent magnets.

3. The magnetic disk drive apparatus as claimed in claim 1, wherein the permanent magnets have magnetic pole end surfaces substantially in parallel to air bearing surfaces of said pair of magnetic head sliders rested in said head resting portions.

4. The magnetic disk drive apparatus as claimed in claim 1, wherein the permanent magnets have magnetic pole end surfaces inclined to air bearing surfaces of said pair of magnetic head sliders rested in said head resting portions.

5. The magnetic disk drive apparatus as claimed in claim 1, wherein said pair of permanent magnets is mounted inside said ramp mechanism.

6. The magnetic disk drive apparatus as claimed in claim 1, wherein said ramp mechanism further has soft magnetic members formed at positions separated from said pair of permanent magnets in the sides opposite to said head resting portions and running in parallel to said pair of permanent magnets.

7. The magnetic disk drive apparatus as claimed in claim 1, wherein said ramp mechanism further has guides for guiding said pair of magnetic head sliders to said head resting portions respectively under the unloading states.

* * * * *